(12) United States Patent
Chen

(10) Patent No.: US 9,296,099 B2
(45) Date of Patent: Mar. 29, 2016

(54) SMALL MACHINE TOOL

(75) Inventor: Bach Pang-Ho Chen, Taoyuan County (TW)

(73) Assignee: DIN LONG INDUSTRIAL CO., LTD., Luzhu Township, Taoyuan County (TW)

( * ) Notice: Subject to any disclaimer, the term of this patent is extended or adjusted under 35 U.S.C. 154(b) by 721 days.

(21) Appl. No.: 13/460,362

(22) Filed: Apr. 30, 2012

(65) Prior Publication Data
US 2013/0284479 A1 Oct. 31, 2013

(51) Int. Cl.
| | |
|---|---|
| *H02K 7/06* | (2006.01) |
| *E21B 3/00* | (2006.01) |
| *B25F 5/02* | (2006.01) |
| *H02K 7/14* | (2006.01) |
| *H02K 1/18* | (2006.01) |
| *H02K 11/00* | (2006.01) |
| *B24B 23/02* | (2006.01) |
| *B23B 45/02* | (2006.01) |
| *H02K 3/46* | (2006.01) |

(52) U.S. Cl.
CPC . *B25F 5/02* (2013.01); *B23B 45/02* (2013.01); *B24B 23/02* (2013.01); *H02K 1/187* (2013.01); *H02K 7/145* (2013.01); *H02K 11/0073* (2013.01); *H02K 3/46* (2013.01)

(58) Field of Classification Search
CPC .............. E21B 3/00; B25F 5/02; B25F 5/00; B23B 45/02; H02K 7/145; H02K 7/14; H02K 5/163; H02K 5/1737; H02K 21/22; B24B 23/022; B24B 23/02; B25D 2250/095; B25D 2250/245

USPC ........ 173/213, 217, 109, 171; 310/47, 50, 75, 310/156.01
See application file for complete search history.

(56) References Cited

U.S. PATENT DOCUMENTS

| | | | | |
|---|---|---|---|---|
| 4,613,000 A | * | 9/1986 | Moore .......................... | 173/217 |
| 5,136,197 A | * | 8/1992 | Hallett ............................ | 310/83 |
| RE35,372 E | * | 11/1996 | Houben et al. ................ | 173/109 |
| 6,405,807 B1 | * | 6/2002 | Pan ................. | 173/217 |
| 7,753,135 B2 | * | 7/2010 | Lennartz ....................... | 173/109 |
| 2009/0126964 A1 | * | 5/2009 | Schroeder et al. ............ | 173/217 |
| 2009/0133894 A1 | * | 5/2009 | Mizuhara ...................... | 173/217 |
| 2010/0163266 A1 | * | 7/2010 | Matsunaga et al. ........... | 173/217 |

FOREIGN PATENT DOCUMENTS

TW    M323163 U    12/2007

* cited by examiner

*Primary Examiner* — Gloria R Weeks
*Assistant Examiner* — Justin Citrin
(74) *Attorney, Agent, or Firm* — Muncy, Geissler, Olds & Lowe, P.C.

(57) ABSTRACT

A small machine tool includes a hollow housing, a holder located in the hollow housing and a driving unit coupled with the holder. The hollow housing has a holding portion and an aperture run through by a tool head. The holder has a coupling portion connected to the holding portion and a hollow shaft portion coaxial with the aperture. The hollow shaft portion includes an ancillary support member and at least one ancillary rotary member. The driving unit includes a stator coupled on the hollow shaft portion, a rotor located outside the stator and a spindle having two ends respectively coupling with the rotor and tool head and running through the hollow shaft portion, ancillary support member and ancillary rotary member. The spindle is driven by the rotor to drive the tool head to rotate.

7 Claims, 4 Drawing Sheets

SMALL MACHINE TOOL

FIELD OF THE INVENTION

The present invention relates to a machine tool and particularly to a small machine tool.

BACKGROUND OF THE INVENTION

Machine tool generally means a dynamic machinery apparatus used for precisely cutting metal to produce metal elements for other machining centers. In order to fabricate a working piece the machine tool generates a relative motion between the working piece and a tool. The motion can be divided into main motion and feed motion. Through this relative motion machining can be done on the working piece. The conventional machine tools mainly can be divided into a stationary machine tool and a hand-held machine tool. The fixed type machine tool generally has a relatively larger size. Its operation mode is moving the working piece to the machine tool to perform machining. The machine tool is fixedly located on a workstation or work area, and stands alone by itself. The hand-held machine tool is formed in a smaller size and functions in another operation mode by moving it to the working piece to do machining. The machine tool can be held or braced by hands or suspended or mounted onto a rack, and can be easily carried to a working site.

With advance of technology the goods being used now follow a trend of slim and light. Fabrication technique also is more precise and delicate. Take operation of the hand-held machine tool as an example, it also has to be made smaller and operable easier in response to the prevailing trend. The conventional hand-held machine tools mostly have two end plates to hold a spindle coupled with a tool head. For instance, R.O.C. patent No. M323163 discloses a motor including mainly a casing, a rotor set, a stator set, an air fan set and a plurality of cooling tubes. The rotor set has a spindle extended outside a front end plate and a rear end plate of the casing. The stator set is held inside the casing to receive electric current to generate a magnetic field to drive the rotor set spinning. Such a design uses the front and rear end plates to hold the spindle, hence needs space to accommodate the two end plates. As a result, trying to shrink the size of the machine tool encounters constraints. Moreover, when in need to increase power output larger ball bearings have to be installed on the front and rear end plates, as a result the size of the machine tool also increases. All these cannot conform to the prevailing trend of slim and light.

SUMMARY OF THE INVENTION

The primary object of the present invention is to solve the problems of the conventional machine tools that are constrained by the front and rear end plates and make shrinking the size impossible.

To achieve the foregoing object, the present invention provides a small machine tool which includes a hollow housing, a holder located in the hollow housing and a driving unit coupled with the holder. The hollow housing has a holding portion inside and an aperture run through by a tool head. The holder has a coupling portion connected to the holding portion and a hollow shaft portion coaxial with the aperture. The hollow shaft portion includes an ancillary support member and at least one ancillary rotary member. The driving unit includes a stator coupled on the hollow shaft portion to receive electricity to generate a magnetic force, a rotor located outside the stator and driven by the magnetic force to rotate, and a spindle having two ends respectively coupled with the rotor and tool head and coaxial with the aperture to run through the hollow shaft portion, ancillary support member and ancillary rotary member. The spindle is driven by the rotor to drive the tool head to rotate.

In one aspect the stator is electrically connected to an electric power source which has a control circuit to output electric power to the stator and a power cord connecting to the control circuit and stator.

In another aspect the coupling portion has a wiring groove to hold the power cord.

In yet another aspect the control circuit is held in the hollow housing.

In yet another aspect the rotor has a plurality of clamp portions to clamp the spindle.

In yet another aspect the hollow shaft portion includes a spacer to divide the hollow shaft portion into a first housing chamber to hold the ancillary support member and a second housing chamber communicating with the first housing chamber to hold the ancillary rotary member.

In yet another aspect the ancillary support member and ancillary rotary member are ball bearings.

The small machine tool of the invention thus formed provides many benefits, notably:

1. It differs from the conventional machine tool constrained by the front and rear end plates by providing a single holder incorporated with the rotor and stator, and a spindle with one end connecting to the rotor and another end running through the ancillary support member to be braced thereon. After the stator has received electricity to drive the rotor to rotate, the spindle is in turn driven by the rotor to rotate steadily. Hence the space needed for holding the rear end plate can be saved, and the volume of the machine tool also can be greatly shrunk.

2. In the event that greater output power is required to generate greater rotation force, while the conventional machine tool has to increase the size of the ball bearings or add more ball bearings at two ends of the spindle that also increases the volume of the machine tool, the invention provides one or more ancillary rotary members in the second housing chamber without adding extra space to accommodate the ancillary rotary members and increasing the size thereof to further increase the volume of the machine tool.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
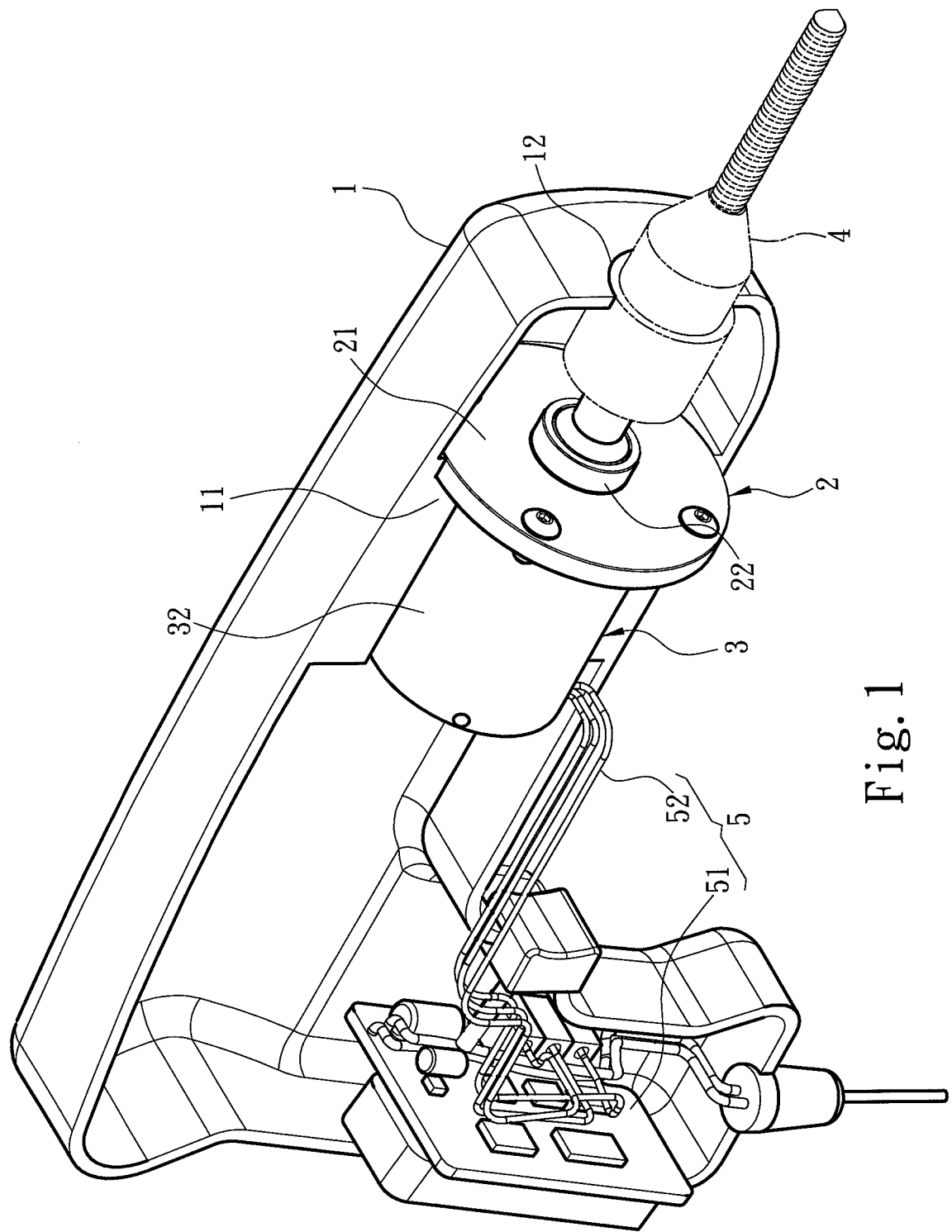
FIG. 1 is a schematic view of the small machine tool of the invention.
Figure 2:
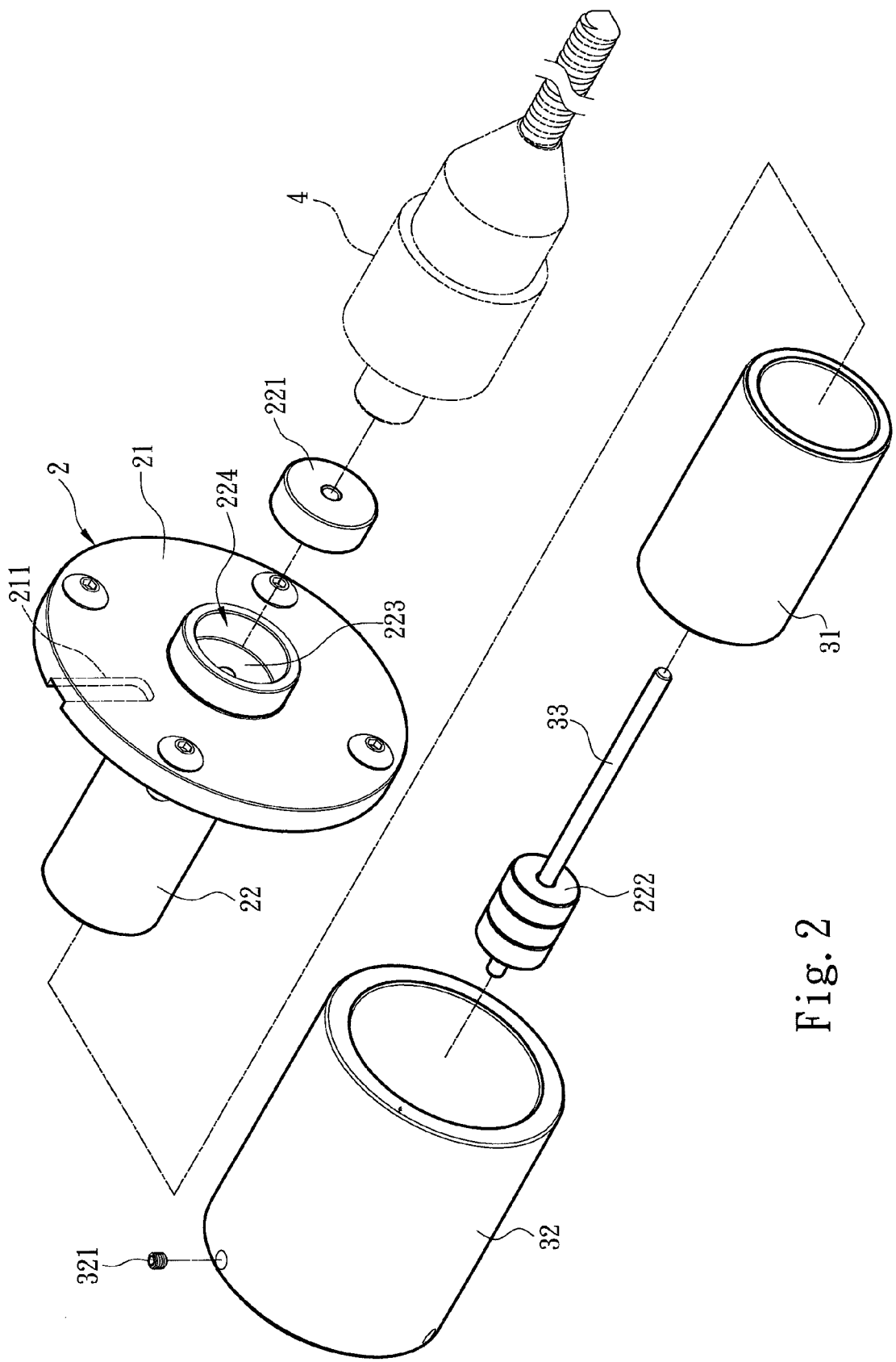
FIG. 2 is an exploded view of the small machine tool of the invention.
Figure 3:
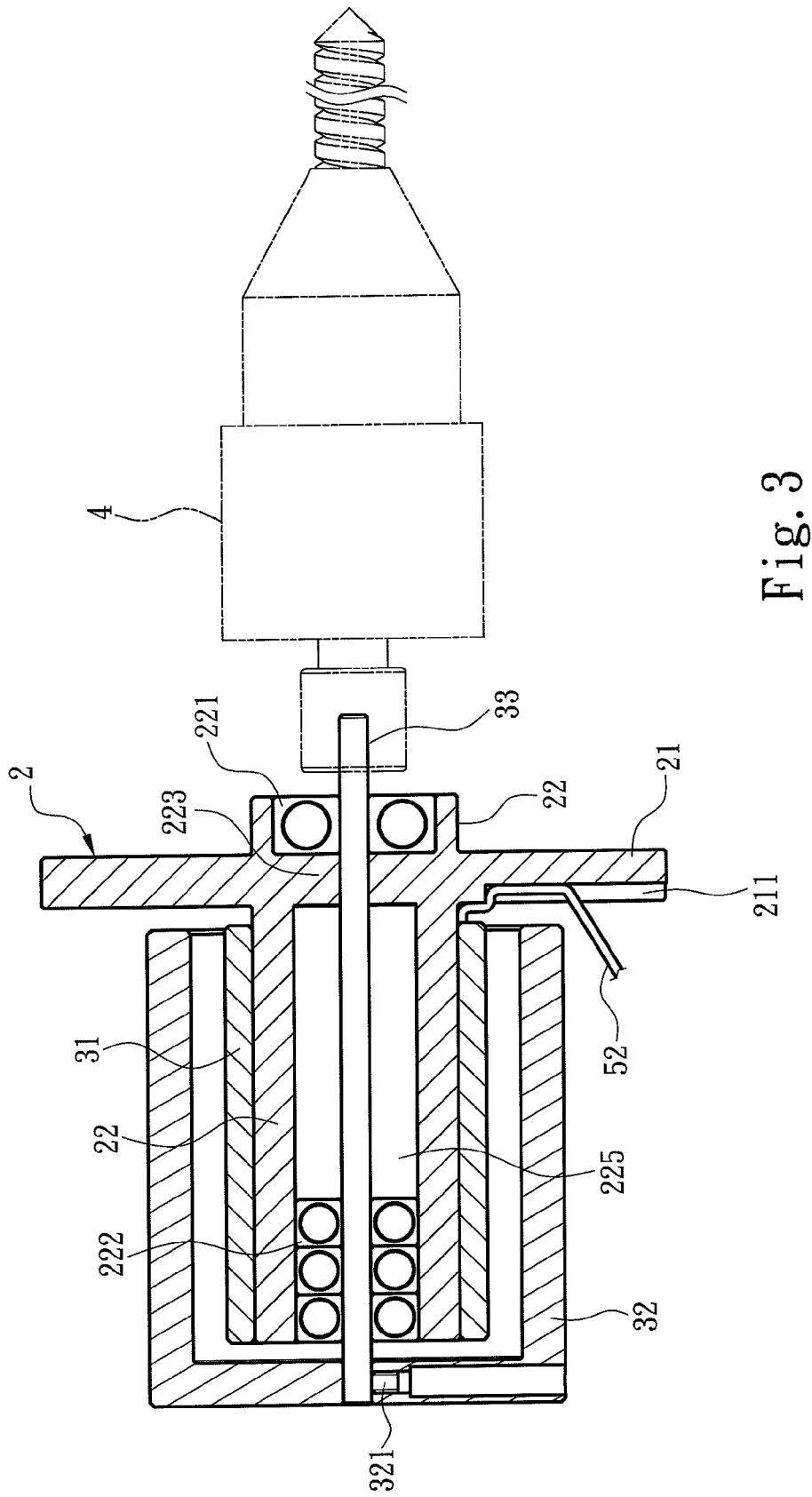
FIG. 3 is a sectional view of the small machine tool of the invention.

Please refer to FIGS. 1, 2 and 3, the present invention aims to provide a small machine tool that includes a hollow housing 1, a holder 2 located in the hollow housing 1 and a driving unit 3 coupled with the holder 2. The hollow housing 1 has a holding portion 11 and an aperture 12 run through by a tool head 4. The holder 2 has a coupling portion 21 connected to the holding portion 11 and a hollow shaft portion 22 coaxial with the aperture 12. The hollow shaft portion 22 includes an ancillary support member 221 and at least one ancillary rotary member 222. The driving unit 3 includes a stator 31 coupled on the hollow shaft portion 22 to receive electricity to generate a magnetic force, a rotor 32 located outside the stator 31 and driven by the magnetic force to rotate, and a spindle 33 which has two ends respectively coupled with the rotor 32 and the tool head 4 and is coaxial with the aperture 12 to run through the hollow shaft portion 22, ancillary support member 221 and ancillary rotary member 222. The spindle 33 is driven by the rotor 32 to drive the tool head 4 to rotate.

In one embodiment of the invention, the rotor 32 has a plurality of clamp portions 321 at one end to clamp the spindle 33. The spindle 33 has one end clamped by the clamp portions 321 and driven by the rotor 32, and another end running through the ancillary support member 221 to be braced thereof. The ancillary support member 221 and ancillary rotary member 222 are ball bearings to stabilize spinning of the spindle 33 without wobbling to achieve more precise operation. The invention differs from the conventional machine tool which has two end plates at the front and rear sides to hold respectively a ball bearing by providing a spacer 223 on the hollow shaft portion 22 to divide the hollow shaft portion 22 into a first housing chamber 224 to hold the ancillary support member 221 and a second housing chamber 225 to hold the ancillary rotary member 222, thereby the invention can match different output power by increasing the number of the ancillary rotary member 222 in the second housing chamber 225 in response to a stronger rotation force of the spindle 33 without adding extra space.

Moreover, the invention also provides another advantage. While the conventional machine tool has to use a better power supply to provide a steadier current to achieve higher work precision that results in a higher cost, the invention, by providing the second housing chamber 225 to hold a plurality of ancillary rotary members 222, can be incorporated with a cheaper power supply even if it provides less stable current. The ancillary rotary members 222 and ancillary support member 221 can compensate the unstable current to stabilize the spinning of the spindle 33 without wobbling, thus can stabilize the operation precision of the spindle 33.

In this embodiment of the invention, the stator 31 is electrically connected to an electric power source 5 which has a control circuit 51 located in the hollow housing 1 to output electric power to the stator 31 and a power cord 52 connecting to the control circuit 51 and stator 31. To avoid the power cord 52 from entangling with the rotor 32 during rotation of the rotor 32, the coupling portion 21 has a wiring groove 211 to hold the power cord 52 that threads through the wiring groove 211 to connect to the stator 31. As the control circuit 51 outputs a current to the stator 31, the stator 31 can generate a magnetic force to drive the rotor 32 to rotate. Then the rotor 32 drives the spindle 33 and the tool head 4 to spin to perform processing operation. The tool head 4 is a drill in this embodiment.

Figure 4:
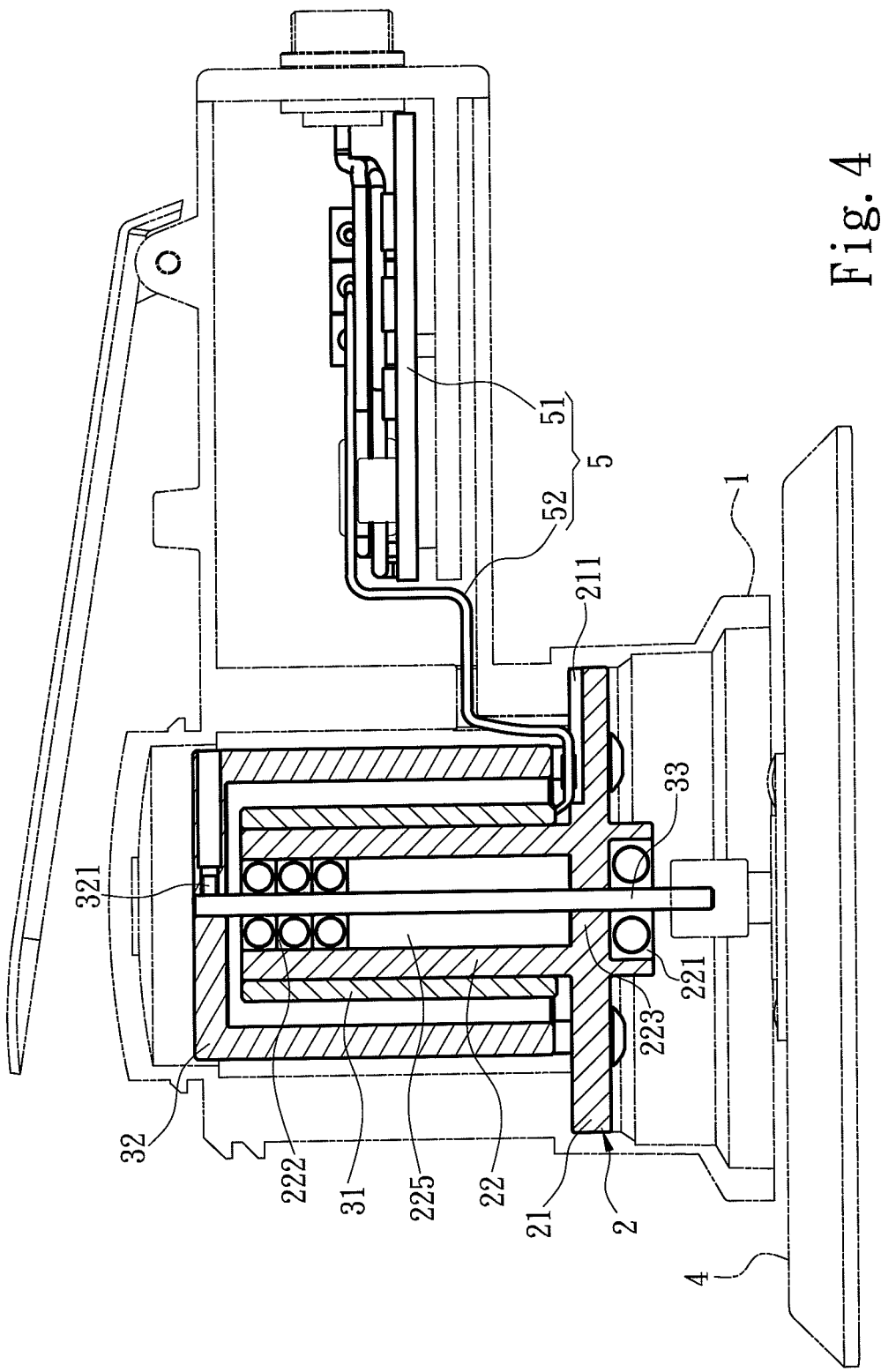
FIG. 4 is a sectional view of another embodiment of the small machine tool of the invention.

Also refer to FIG. 4 for another embodiment in which the tool head 4 is a grinding disc. The spindle 33 spins steadily through being braced and stabilized by the ancillary support member 221 in the first housing chamber 224 and ancillary rotary member 222 in the second housing chamber 225. ON/OFF of the magnetic force on the stator 31 also is controlled by the control circuit 51. In this embodiment the control circuit 51 is located in the hollow housing 1, but this is not the limitation. During operation of the machine tool the control circuit 51 generates heat, hence radiation fins are added to perform cooling and prevent overheat. To comply with the trend of slim and light, aside from holding the control circuit 51 in the hollow housing 1 as previously discussed, it also can be installed outside the machine tool and connected to the power cord 52. Then the machine tool can be further shrunk in size and weight.

As a conclusion, the machine tool according to the invention does not have the constraint of the front and rear end plates occurred to the conventional machine tool, and has a spindle with one end coupled with a rotor via a single holder incorporating with an outer rotor structure, and also has another end run through the ancillary support member to be braced thereon. After the stator has received electricity to drive the rotor to rotate, the spindle is driven by the rotor to spin steadily. Thus the space otherwise needed for the rear end plate can be saved, and the size of the machine tool can be shrunk as desired.

In addition, in the event that a greater output power is required to generate a greater rotation force, while the conventional machine tool has to increase the size of the ball bearings or add more ball bearings at two ends of the spindle that also increases the volume of the machine tool, the invention provides more than one ancillary rotary members in the second housing chamber without adding extra space to accommodate the ancillary rotary members and increasing the size thereof to further increase the volume of the machine tool. It provides significant improvements over the conventional technique.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A small machine tool, comprising:
   a hollow housing including a holding portion and an aperture run through by a tool head;
   a holder including a coupling portion which is connected to the holding portion and restricted a movement thereof by the holding portion, a hollow shaft tube shared an axis with the aperture, an ancillary support member located in the hollow shaft tube and a plurality of ancillary rotary members located in the hollow shaft tube, wherein the ancillary support member and the plurality of ancillary rotary members are located at two different sides of the coupling portion; and
   a driving unit including a stator coupled with the hollow shaft tube to receive electricity to generate a magnetic force, a spindle, which is coaxial with the aperture, running through the hollow shaft tube, the ancillary support member and the plurality of ancillary rotary members, and a rotor suspended located outside the stator and driven by the magnetic force to rotate, wherein the rotor is supported only by the spindle;
   wherein the spindle has a first end which runs through the ancillary support member and is braced by the ancillary support member, and a second end which runs through the plurality of ancillary rotary members and is braced by the plurality of ancillary rotary members, the first end of the spindle is directly coupled to and coaxial with the tool head, the second end of the spindle is coupled with the rotor and braces the rotor; and
   wherein the spindle is driven by the rotor and is supported by the ancillary support member and the plurality of ancillary rotary members to spin steadily after the stator has received electricity to drive the rotor to rotate.

2. The small machine tool of claim 1, wherein the stator is electrically connected to an electric power source which includes a control circuit to output electric power to the stator and a power cord connecting to the control circuit and the stator.

3. The small machine tool of claim 2, wherein the coupling portion includes a wiring groove to hold the power cord.

4. The small machine tool of claim 2, wherein the control circuit is located in the hollow housing.

5. The small machine tool of claim 1, wherein the rotor includes a plurality of clamp portions to clamp the spindle.

6. The small machine tool of claim 1, wherein the hollow shaft tube includes a spacer to divide the hollow shaft tube into a first housing chamber to hold the ancillary support member and a second housing chamber communicating with the first housing chamber to hold the plurality of ancillary rotary members.

7. The small machine tool of claim 1, wherein the ancillary support member and the plurality of ancillary rotary members are ball bearings.

\* \* \* \* \*